(12) United States Patent
Elboher

(10) Patent No.: US 10,958,854 B2
(45) Date of Patent: Mar. 23, 2021

(54) COMPUTER-IMPLEMENTED METHOD FOR GENERATING AN OUTPUT VIDEO FROM MULTIPLE VIDEO SOURCES

(71) Applicant: BRIEFCAM LTD., Yarei Yehuda (IL)

(72) Inventor: Elhanan Hayim Elboher, Modiin-Maccabim-Reut (IL)

(73) Assignee: Briefcam Ltd., Modi'in-Maccabim-Re'ut (IL)

( * ) Notice: Subject to any disclaimer, the term of this patent is extended or adjusted under 35 U.S.C. 154(b) by 0 days.

(21) Appl. No.: 16/664,521

(22) Filed: Oct. 25, 2019

(65) Prior Publication Data

US 2020/0145590 A1 May 7, 2020

Related U.S. Application Data

(60) Provisional application No. 62/754,904, filed on Nov. 2, 2018.

(51) Int. Cl.
*H04N 5/272* (2006.01)
*H04N 5/247* (2006.01)
(Continued)

(52) U.S. Cl.
CPC ......... *H04N 5/272* (2013.01); *G06K 9/00758* (2013.01); *G06T 7/292* (2017.01);
(Continued)

(58) Field of Classification Search
CPC .................................. H04N 5/272; G06T 7/70
See application file for complete search history.

(56) References Cited

U.S. PATENT DOCUMENTS 8,063,936 B2 11/2011 Samarasekera et al.
8,102,406 B2 1/2012 Peleg et al.
(Continued)

OTHER PUBLICATIONS

Alex Rav-Acha, Y. Pritch, and S. Peleg, "Making a long video short: Dynamic video synopsis," Proceedings of the 2006 IEEE Computer Society Conference on Computer Vision and Pattern Recognition 2006, pp. 435-411.
(Continued)

*Primary Examiner* — Phi Hoang
(74) *Attorney, Agent, or Firm* — Cherskov Flaynik & Gurda, LLC

(57) ABSTRACT

An output video is created by at least two cameras recording respective source videos, each having multiple video frames containing video objects imaged by the cameras corresponding to multiple instances of one or more respective source objects traversing the site. Output video objects having a new start display time are computed such that a total duration of display times of all video objects from all source videos is shorter than a cumulative duration of the source videos. The output video objects or graphical representations thereof are rendered at new display times over a background image such that (i) instances imaged by different cameras at different times are represented simultaneously; (ii) at least two output video objects originating from a common camera have different relative display times to their respective source objects; and (iii) in at least one location there are represented instances imaged by two different cameras.

23 Claims, 4 Drawing Sheets

(51) Int. Cl.
*G06T 7/70* (2017.01)
*G06T 19/00* (2011.01)
*G06K 9/00* (2006.01)
*H04N 7/18* (2006.01)
*G06T 7/292* (2017.01)

(52) U.S. Cl.
CPC .............. *G06T 7/70* (2017.01); *G06T 19/006* (2013.01); *H04N 5/247* (2013.01); *H04N 7/181* (2013.01); *G06T 2207/10016* (2013.01); *G06T 2207/20216* (2013.01); *G06T 2207/20221* (2013.01); *G06T 2207/30232* (2013.01); *G06T 2207/30241* (2013.01)

(56) References Cited

U.S. PATENT DOCUMENTS

| | | | |
|---|---|---|---|
| 8,311,277 B2 | 11/2012 | Peleg et al. | |
| 8,949,235 B2 | 2/2015 | Peleg et al. | |
| 9,877,086 B2 | 1/2018 | Richardson et al. | |
| 9,996,939 B2 | 6/2018 | Huang et al. | |
| 10,565,455 B2* | 2/2020 | Fridental | H04N 7/181 |
| 2010/0092037 A1* | 4/2010 | Peleg | G11B 27/034 |
| | | | 382/103 |
| 2011/0025846 A1* | 2/2011 | Garrett | H04N 7/18 |
| | | | 348/143 |
| 2012/0026335 A1* | 2/2012 | Brown | G01S 5/16 |
| | | | 348/159 |
| 2015/0169962 A1* | 6/2015 | Liu | G06K 9/00771 |
| | | | 386/278 |
| 2015/0243069 A1* | 8/2015 | Knoblauch | G06T 11/001 |
| | | | 345/420 |
| 2016/0100197 A1* | 4/2016 | Ni | H04N 19/146 |
| | | | 375/240.24 |
| 2016/0210516 A1* | 7/2016 | Kim | G06K 9/00751 |
| 2017/0133053 A1* | 5/2017 | Kardashov | H04N 5/77 |
| 2018/0247135 A1* | 8/2018 | Oami | G06K 9/00778 |

OTHER PUBLICATIONS

Yael Pritch, A. Rav-Acha, and S. Peleg, "Nonchronological video synopsis and indexing," IEEE Trans. PAMI, vol. 30, No. 11, pp. 1971-1984, 2008.
Yedid Hoshen and S. Peleg, "Live video synopsis for multiple cameras," ICIP, 2015, pp. 212-216.
Shaoqing Ren, K. He, R. Girshick, and J. Sun, "Faster r-cnn: Towards real-time object detection with region proposal networks," Advances in neural information processing systems, 2015, pp. 91-99.
Wei Liu, D. Anguelov, D. Erhan, C. Szegedy, S. Reed, C.-Y. Fu, and A. C. Berg, "SSD: Single shot multibox detector," European Conference on Computer Vision. Springer, 2016, pp. 21-37.
Kaiming He, G. Gkioxari, P. Dollar, and R. Girshick, "Mask r-cnn," in Computer Vision (ICCV), 2017 IEEE International Conference on. IEEE, 2017, pp. 2980-2988.
Wenhan Luo, J. Xing, A. Milan, X. Zhang, W. Liu, X. Zhao, and T.-K. Kim, "Multiple object tracking: A literature review," arXiv preprint arXiv:1409.7618, 2014.
Richard Hartley and A. Zisserman, Multiple view geometry in computer vision. Cambridge University Press, 2003.
H. S. Sawhney, A. Arpa, R. Kumar, S. Samarasekera, M. Aggarwal, S. Hsu, D. Nister, and K. Hanna, "Video flashlights: real time rendering of multiple videos for immersive model visualization," in ACM International Conference Proceeding Series, vol. 28, 2002, pp. 157-168.
Walid Ayedi, H. Snoussi, and M. Abid, "A fast multi-scale covariance descriptor for object re-identification," Pattern Recognition Letters, vol. 33, No. 14, pp. 1902-1907, 2012.
Apurva Bedagkar-Gala and S. K. Shah, "A survey of approaches and trends in person re-identification," Image and Vision Computing, vol. 32, No. 4, pp. 270-286, 2014.
Xinchen Liu, W. Liu, H. Ma, and H. Fu, "Large-scale vehicle re-identification in urban surveillance videos," in Multimedia and Expo (ICME), 2016 IEEE International Conference on. IEEE, 2016, pp. 1-6.

* cited by examiner

COMPUTER-IMPLEMENTED METHOD FOR GENERATING AN OUTPUT VIDEO FROM MULTIPLE VIDEO SOURCES

RELATED APPLICATION

This application claims benefit of provisional application Ser. No. 62/754,904 filed Nov. 2, 2018 whose contents are incorporated herein by reference.

FIELD OF THE INVENTION

This invention relates to video synopsis.

PRIOR ART

Prior art references considered to be relevant as a background to the invention are listed below and their contents are incorporated herein by reference. Additional references are mentioned in the above-referenced U.S. Ser. No. 62/754,904 and its contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] A. Rav-Acha, Y. Pritch, and S. Peleg, "Making a long video short: Dynamic video synopsis," in *CVPR*, 2006, pp. 435-441.

[2] Y. Pritch, A. Rav-Acha, and S. Peleg, "Nonchronological video synopsis and indexing," *IEEE Trans. PAMI*, vol. 30, no. 11, pp. 1971-1984, 2008.

[3] S. Peleg and A. Rav-Acha, "Method and system for producing a video synopsis," U.S. Pat. No. 8,102,406, 2012.

[4] S. Peleg, Y. Pritch, A. Rav-Acha, and A. Gutman, "Method and system for video indexing and video synopsis," U.S. Pat. No. 8,311,277, 2012.

[5] S. Peleg, Y. Pritch, S. Ratovitch, and A. Hendel, "Method and system for producing a video synopsis using clustering," U.S. Pat. No. 8,949,235, 2015.

[6] E. Richardson and S. Peleg, "Method and system for producing relevance sorted video summary," U.S. Pat. No. 9,877,086, 2018.

[7] Y. Hoshen and S. Peleg, "Live video synopsis for multiple cameras," in *ICIP*, 2015, pp. 212-216.

[8] S. Ren, K. He, R. Girshick, and J. Sun, "Faster r-cnn: Towards real-time object detection with region proposal networks," in *Advances in neural information processing systems*, 2015, pp. 91-99.

[9] W. Liu, D. Anguelov, D. Erhan, C. Szegedy, S. Reed, C.-Y. Fu, and A. C. Berg, "SSD: Single shot multibox detector," in *European conference on computer vision*. Springer, 2016, pp. 21-37.

[10] K. He, G. Gkioxari, P. Dollár, and R. Girshick, "Mask r-cnn," in *Computer Vision (ICCV)*, 2017 *IEEE International Conference on*. IEEE, 2017, pp. 2980-2988.

[11] W. Luo, J. Xing, A. Milan, X. Zhang, W. Liu, X. Zhao, and T.-K. Kim, "Multiple object tracking: A literature review," *arXiv preprint arXiv*: 1409.7618, 2014.

[12] R. Hartley and A. Zisserman, *Multiple view geometry in computer vision. Cambridge university press*, 2003.

[13] H. S. Sawhney, A. Arpa, R. Kumar, S. Samarasekera, M. Aggarwal, S. Hsu, D. Nister, and K. Hanna, "Video flashlights: real time rendering of multiple videos for immersive model visualization," in *ACM International Conference Proceeding Series*, vol. 28, 2002, pp. 157-168.

[14] U.S. Pat. No. 8,063,936, "Modular immersive surveillance processing system and method"

[15] K. Huang, C. Lijun, and W. Chen, "Large-range-first cross-camera visual target re-identification method," U.S. Pat. No. 9,996,939, 2018.

[16] W. Ayedi, H. Snoussi, and M. Abid, "A fast multi-scale covariance descriptor for object re-identification," *Pattern Recognition Letters*, vol. 33, no. 14, pp. 1902-1907, 2012.

[17] A. Bedagkar-Gala and S. K. Shah, "A survey of approaches and trends in person re-identification," *Image and Vision Computing*, vol. 32, no. 4, pp. 270-286, 2014.

[18] X. Liu, W. Liu, H. Ma, and H. Fu, "Large-scale vehicle re-identification in urban surveillance videos," in *Multimedia and Expo (ICME)*, 2016 *IEEE International Conference on*. IEEE, 2016, pp. 1-6.

BACKGROUND OF THE INVENTION

Reviewing scene activity by watching video clips from surveillance cameras is boring and time consuming. In many cases the activity is sparse, and time compression can be achieved by extracting the moving objects from the original video and reviewing only these objects. Video Synopsis [1, 2, 3, 4] makes the review faster by re-arranging the extracted objects in time so that high temporal compression is achieved. The re-arranged objects are usually displayed on a synthetic background image that is learned statistically from the original video.

While allowing fast review of long videos with sparse activity, Video Synopsis has several significant limitations: (i) Video Synopsis is based on the assumption that the camera is static; (ii) Video Synopsis is limited to the camera viewpoint; and (iii) the extracted objects should be segmented accurately to avoid displaying artifacts while stitching them on the background image. The segmentation may be performed incorrectly in many scenarios such as mutually occluding objects, hardly visible objects, etc.

Video Synopsis

Video Synopsis as described in [1, 2, 3, 4] relates to a video recorded by a single stationary camera. Moving objects are first extracted from the original video, and then temporally re-arranged and displayed on the original background. The result is a shorter video, showing all the activity in the scene in shorter time.

Extensions of Video Synopsis include presentation of clustered objects [5] and ordering the displayed objects by their relevance to a predefined objective function [6]. In [7] an attempt is made to use synopsis in a multi-camera case, by arranging a synopsis of the objects in one camera based on objects that appear in another camera.

All the above-mentioned works generate video clips which display the extracted objects in their original surrounding, i.e., on a background image learned from the same camera in which the objects appeared. Other display modes, such as displaying icons or using background unrelated to the original camera, have not been used.

Object Extraction

Spatio-temporal rearrangement of the scene objects, as done by Video Synopsis, requires a preliminary stage in which the objects of interest are detected and tracked in the original video. In [1, 3], the scene background model is learned statistically, and moving objects are extracted by their difference from the background model. Such a background subtraction method is applicable as long as the recording camera is static. An alternative method is executing an object detector such as Faster-RCNN [8] or SSD [9] over the input video frames, providing the bounding box locations of the scene objects. Pixel level object masks can be computed using instance segmentation methods such as Mask-RCNN [10]. These methods are applicable also for video frames recorded by a moving camera.

Multiple object tracking methods such as reviewed in [11] connect the detections of each individual object in different video frames, based on appearance and motion similarity. This provides the trajectories of the different scene objects.

Any of the existing methods for background subtraction, moving object segmentation, and objects tracking, known by people skilled in the art, is possible. The result after applying these methods is a "tube" representing a single object: a sequence of locations of this object in successive frames, from its earliest appearance to its last appearance.

Camera Parameters

For each camera there are associated internal and external parameters. Internal parameters include optical parameters such as focal length and lens distortion. External camera parameters include 3D pose of the camera (i.e. pan, tilt, roll angles) and its 3D spatial location. Estimation of internal and external camera parameters is described in [12].

It is also possible to calibrate the camera with a 2D or 3D surface without estimating all the camera parameters. Calibration of a planar surface in two views can be done by matching at least four corresponding points [12]. This calibration can be used for mapping object trajectories from the image plane into 2D reference models such as a map or a diagram.

The 3D pose of a camera relative to a ground surface can be estimated from the angles measured by an accelerometer attached to the camera. In [13, 14], a method is proposed to calibrate a camera with a reference 3D model using a 3D pose estimation module. For fixed cameras, the pose is estimated once. For moving cameras (e.g. Pan/Tilt/Zoom and aerial cameras), pose can be estimated every frame. This allows the object trajectories inside the 3D model to be located.

Object Matching

Multiple instances of an object can be recognized using several approaches. If the object is visible simultaneously by two calibrated cameras, matching can be done by determining whether the two instances occupy the same space at the same time. In other cases, pairs of video objects can be matched by their similarity, such as appearance and/or motion similarity. This technology is called object re-identification [15, 16, 17, 18].

SUMMARY OF THE INVENTION

In accordance with a broad aspect of the invention, there is provided a computer-implemented method for generating an output video, the method comprising:

obtaining respective source videos recorded by at least two cameras in a site, each of said source videos comprising multiple video frames containing video objects imaged by said cameras, said video objects corresponding to multiple instances of one or more respective source objects;

obtaining for detected video objects in each source video, respective tracks containing locations of the respective video objects in the video frames;

for at least some of said video objects computing output video objects having a new start display time of each video object selecting a background image on which to render the output video objects; and generating an output video by rendering the output video objects or graphical representations thereof at their new display times over the selected background image such that:
  (i) instances imaged by different cameras at different times are represented simultaneously in the output video;
  (ii) at least two output video objects originating from a common camera have different relative display times to their respective source objects; and
  (iii) there exists at least one location in the output video wherein there are represented instances imaged by two different cameras.

Although the invention is particularly applicable to the case where a site is recorded by multiple cameras thus producing multiple video sequences, it also contemplates the case in which a site is viewed by a single camera that records a single video sequence, as long as the detected object trajectories are projected onto a reference model, and a video synopsis is generated from the representation in the model.

For the sake of clarity, it should be noted that the term "source objects" refers to physical objects that are imaged by the cameras, which then create "video objects" or, more simply, "objects". The video objects are video frames or portions of video frames that depict at least part of the source objects. For example, a video camera may image a person's face so that successive frames of a video sequence contain video objects depicting the respective images. Video objects in discrete video sequences can be matched using known techniques so as to determine whether or not they relate to the same source object. In some embodiments this is done to establish that video objects imaged by different cameras that image non-overlapping volumes in a common space actually pertain to the same source object, in which case the two video objects can be represented in the output video simultaneously.

In some embodiments, selected source objects can be depicted in discrete output videos that are displayed on respective display devices as opposed to conventional video synopses where all output video objects are depicted in a common video sequence. An advantage of showing the passage through space and time of a selected source object in separate video sequences is that the video objects in each sequence are imaged at different times and are therefore necessarily spatially separated. This may not be, and typically is not, the case when a common source object is images by two or more cameras having overlapping fields of view in which case care must be taken to ensure that two or more video objects belonging to the same object do not mutually obscure each other in the output video.

In one aspect, the present invention proposes an extension of Video Synopsis which displays the detected objects from multiple cameras, or their representations, on a reference model such as a 3D model or a 2D map, instead of displaying the objects on the original background image of the recorded scene. The proposed model-based Video Synopsis allows displaying objects viewed by different cameras, either static or dynamic, as long as it is possible to map the object locations from the camera plane into the reference model. In addition to displaying the cropped or warped pixels of the original objects, icons can alternatively be used. This option can overcome the limitations of inaccurate segmentation and geometric distortion.

The main challenges for providing a model based Video Synopsis are (1) successful detection of the scene objects, (2) successful multiple object tracking and (3) correct mapping of the object trajectories into a given reference model. The mapped object trajectories can be re-arranged in time in a similar manner as described in [1, 3], and presented by graphical elements moving relative to the reference model.

An additional method described in this invention is synchronized video synopsis, which is applicable to videos from multiple stationary cameras. A set of synopsis videos is generated, one per camera, which synchronize the display of objects viewed by more than a single camera. In other words, if an object is seen by different cameras at the same time, then it is displayed simultaneously in all the corresponding synopsis videos. This is an improvement over known video synopsis methods, which process the video from each camera independently as distinct from previous video summarization methods which display the different views of the same object at different times. When an object is viewed concurrently by several cameras, independent processing will result in the same objects being displayed at a different time in each synopsis video. The novelty of the proposed synchronized video synopsis is based on joint spatio-temporal rearrangement, which extends the technique described in [1, 2, 3, 4] from a single space-time volume into multiple constrained volumes, as described in detail below.

In another aspect, the invention provides a method that generates a single Video Synopsis from multiple input videos with no need of a reference model or advanced spatio-temporal rearrangement scheme. This simple method assigns new display times to all the extracted objects in a common space time volume and renders them over an arbitrary background image. An extension is also proposed for the case in which an object re-identification method is available which allows to connect between multiple recordings of the same real object at different times or by different cameras.

Embodiments of the invention thus relate to a number of different cases. In one case, multiple cameras record video sequences of a site from different camera perspectives and an output video is created that displays representations of objects, such that object instances imaged by different cameras at different times are represented simultaneously in the output video, thus creating a video that is shorter in duration that the cumulative durations of the component video sequences. For at least one location in the output video, there are represented instances imaged by two different cameras. This precludes the trivial cases of concatenating multiple video sequences while omitting some frames or of concatenating two video synopses side by side or of displaying two video synopses sequentially or of fast forward with the same speed for all the source videos, which trivially preserves the same display times for objects which have been viewed simultaneously in the source videos.

In another case, not all instances of the same object are recorded simultaneously by all cameras but the different video sequences are synchronized to determine which object instances are common to two or more cameras. These are then represented simultaneously in the output video, thereby showing in a video of shorter duration the spatial progress of the object as it traverses the site.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols.

Figure 1:
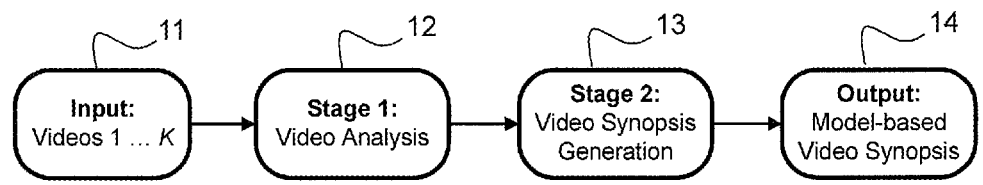
FIG. 1 is a flow diagram of a model-based video synopsis system according to an embodiment of the invention.

FIG. 1 is a flow diagram of a model-based video synopsis system 10 according to an embodiment of the invention. The system input is multiple video sequences 11 which are passed into a video analysis stage 12 in which the scene objects are detected, tracked and mapped into a reference model as described in greater detail below. The next stage 13 performs spatio-temporal rearrangement of the objects in the reference model domain as described in greater detail below. The system output is model based video synopsis 14 which displays the objects or their representations asynchronously in the reference model.

The system 10 is implemented as follows. We assume that we are given a reference model constituting a predetermined space such as a 2D map or a 3D point cloud which represents a site in the real world. A single camera or multiple cameras, either static or dynamic, are viewing regions in the site represented by the reference model. The generated Video Synopsis is a video clip which renders the objects as seen in the single or multiple cameras, or their graphical representations, moving in the site model. The objects can be reordered in time as in normal video synopsis.

As shown by FIG. 1, the proposed pipeline consists of two main stages: video analysis and video synopsis generation. The video analysis stage gets as input multiple video sequences from different sources, extracts the objects viewed in these videos and represents their trajectories in a common reference model. This representation is the input of the video synopsis generation stage, which performs spatio-temporal reordering and renders a model-based video synopsis. The multiple input video sequences are typically recorded by different cameras. The extracted objects are analyzed and their trajectories are mapped into a common reference model. In case of multiple cameras, this process is performed independently for each camera. Then an additional step is applied which merges trajectories extracted from different cameras which represent the same real object.

Figure 2:
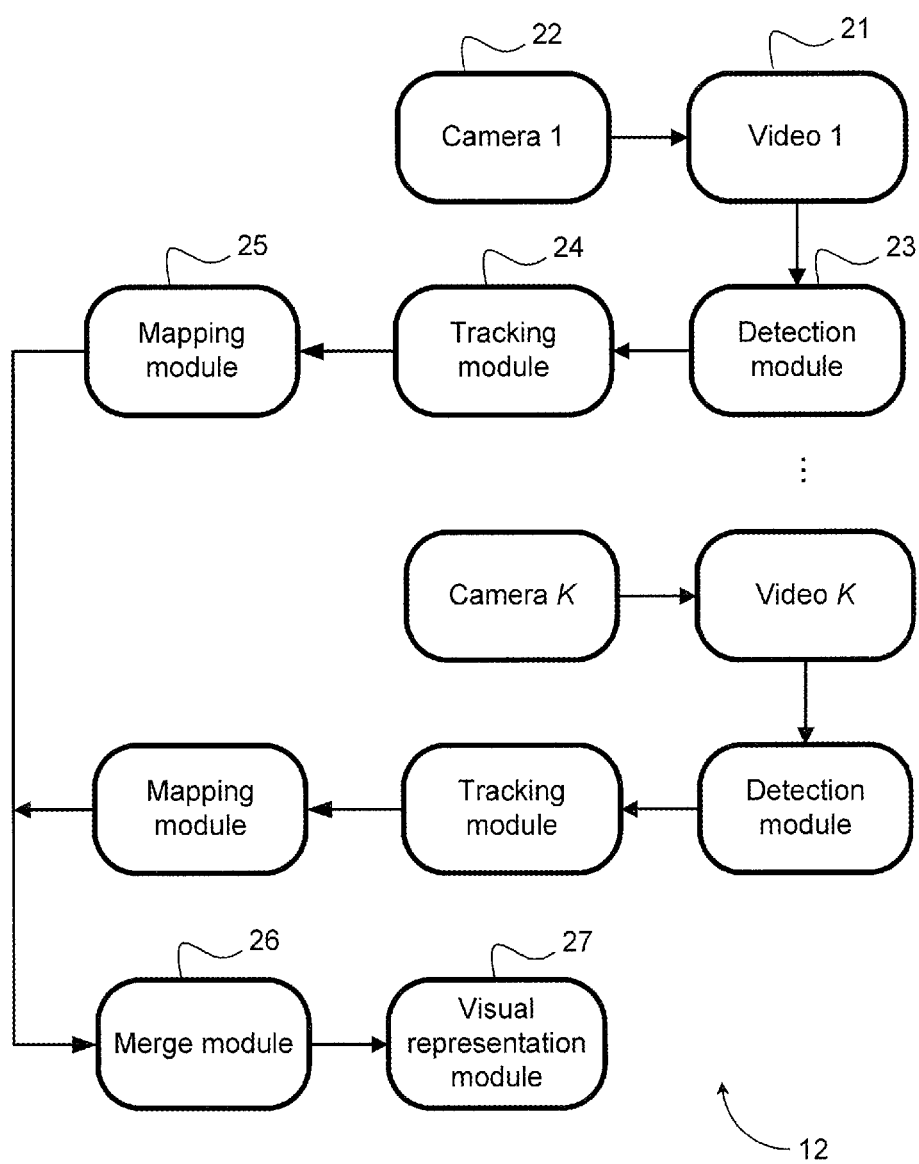
FIG. 2 is a block diagram showing the functionality of the video analysis stage.

FIG. 2 is a block diagram showing in more detail the functionality of the video analysis stage 12 shown in FIG. 1. Given video streams 21 recorded by multiple cameras 22, we extract the objects recorded by each camera independently. The object extraction process described in greater detail below is performed by the following modules: an object detection module 23 which detects objects per frame and provides 2D bounding boxes; an object tracking module 24 which connects the detected bounding boxes into tracklets; and a mapping module 25 which transform the tracked object bounding boxes from the 2D plane of the original video into a common reference model which is either 2D or 3D. Following that mapping, an object merge module 26 merges tracklets from different cameras representing the same real object. For each processed object, a graphical representation is generated 27. This representation is used for rendering the object in a model based video synopsis.

Figure 3:
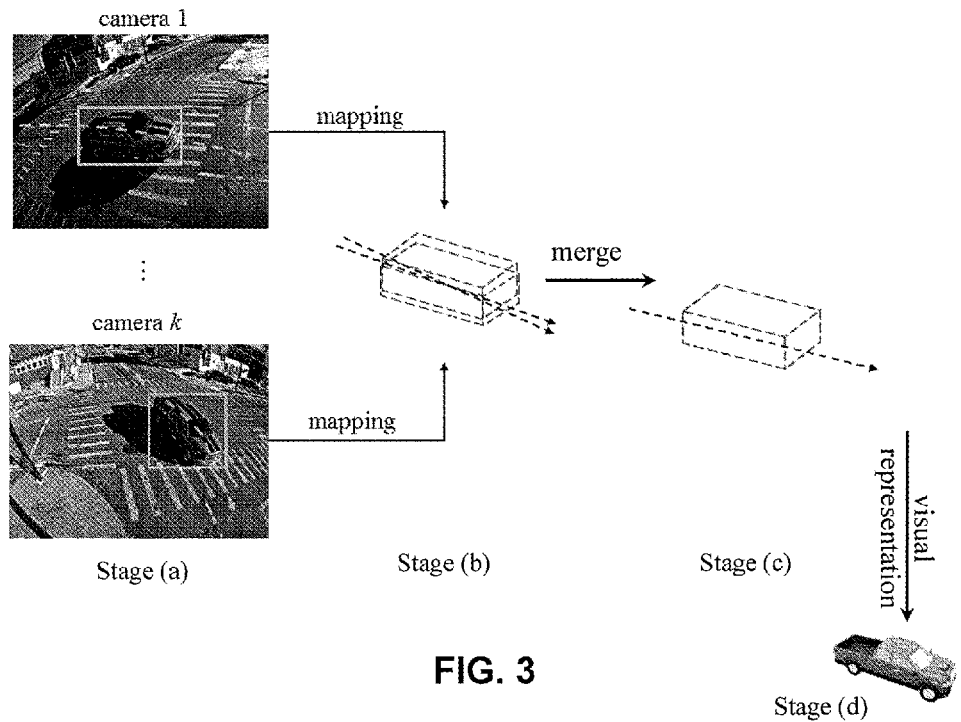
FIG. 3 is a pictorial representation of the object extraction and mapping pipeline.

FIG. 3 is an illustration of the proposed object extraction and mapping pipeline. At stage (a) objects recorded by each camera are detected and tracked independently. At stage (b) the tracked objects are mapped into a common reference model, either 2D or 3D. At stage (c) different views of the same real object in the scene are merged based on overlap and motion similarity in the reference model coordinates and stage (d) derives the graphical representation of the object in the reference model.

Object Extraction (OX)

While some OX methods, like background subtraction, can mostly be applied to static cameras, other OX methods can be applied to dynamic cameras as well. This is unlike classic Video Synopsis that is limited to stationary cameras since it requires the separation between foreground and background pixels.

Our proposed OX pipeline consists of two steps. In the first step, the 2D object detector 23, as described above is applied to video frames, giving locations of detected objects (e.g. objects masks or bounding boxes) at the image plane. A corresponding class label is possible for each object.

In the second step, a tracking method is applied to connect the single frame detections into multi-frame objects, each multi-frame object being represented by a sequence of 2D detections. Pixel level masks of the detected objects can be generated, if required, using instance segmentation methods.

Optionally, an additional object filtering step can be performed based on analysis of the tracked object trajectories and/or the segmented pixel level masks. Information about the object properties can be achieved by extracting different features describing the object class, color distribution, size, motion etc. Similarly to [6], the relevance of each object to some predefined objective function can be calculated. This makes it possible to map into the reference model just a filtered subset of objects, which meet one or more predetermined filtering criteria based on their respective objective function values e.g. only humans or only large objects. In such a case, the final video synopsis is shorter and displays just these relevant objects. The objects can also be reordered in time by their relevance to the objective function.

Mapping into the Reference Model

In order to display the objects at their correct locations in the reference model, the source cameras are calibrated with the reference model in known manner as described above. For each object i and camera c, an object trajectory is defined as:

$$O_i^c = \{(x_j, y_j, t_j)\}_{j=0}^J \quad (1)$$

where $(x_j, y_j)$ is some designated predefined point in the object at time $t_j$ (e.g. the bottom middle point of the 2D object bounding box). The trajectories of the objects which have been detected and tracked in each camera are then mapped into the reference model:

$$M(O_i^c) = \{(M(x_j, y_j), t_j)\}_{j=0}^J \quad (2)$$

where $M(\cdot)$ is a mapping function from the 2D camera plane into the reference model. Each point $M(x_j, y_j)$ represents the object location in the reference model at time $t_j$. This location can be, for example, the bottom middle point of the object's 2D bounding rectangle, or the bottom center point of its 3D bounding box, depending on the reference model dimension.

Based on the mapped object trajectory, a spatio-temporal tube is constructed which consists of the areas (or volumes) of the object representations along time:

$$\text{Tube}_i = \{B_j, t_j\}_{j=0}^J \quad (3)$$

Here, $B_j$ are defined as the 2D or 3D regions containing the object representations in all times $t_j$.

Object Tube from Multiple Cameras

If an object i is viewed from multiple cameras at the same time, then it has multiple overlapping trajectories in the reference model's domain. For each camera pair $\{c,d\}$, the trajectory pair $M(O_i^c), M(O_i^d)$ can be matched by area (or volume) overlap in corresponding frames and by motion similarity. It is possible to merge the matching object trajectories into a single trajectory $M(O_i)$.

An example of a merged trajectory consists of all the mapped locations $M(x_j, y_j)$ in times $t_j$ belonging to the original trajectories $M(O_i^c), M(O_i^d)$. In case of overlapping times $t_j$, when an object is seen in both cameras, the mapped locations in both trajectories can be averaged.

The process of matching and merging object trajectories can be repeated many times until all the trajectories which represent the real object i and have partial time overlap are merged into a single object trajectory $M(O_i)$.

As mentioned above, non-overlapping instances of the same object, as detected by object re-identification methods, either from the same camera or from different cameras, can also be merged. An example of such merge is concatenation of the mapped locations $M(x_j, y_j)$ from both trajectories. Merging objects in the temporal domain can be done in many ways, for example taking the original times $t_j$, or shifting the times of the later trajectory so that it starts immediately after the end of the first trajectory.

As in the case of a trajectory from a single camera, a merged trajectory is also converted into a spatio-temporal tube (Eq. 3).

Graphical Object Representation

In a model based Video Synopsis the rendered objects may be graphically represented in different ways depending on the application and the reference model type (2D, 3D etc.). The possible graphical representations include the original object pixels or object transformation outputs: object thumbnails, head or face thumbnails, icons, synthetic 3D models such as 3D meshes, or any other graphical representation.

Object representation by its original pixels requires warping the object pixels by the appropriate geometric transformation from the camera coordinates to the reference model. In many cases, this can distort the displayed object significantly. Such distortions can be avoided when using the other mentioned graphical representations.

If an icon or a synthetic graphical model is selected to represent the object, different object attributes can be presented such as object class, color, size, direction, pose etc. Alternatively, color coding can be used which indicates the displayed object relevance to specified criteria such as appearance time, dwell time, similarity to a query object etc.

It should be noticed that the object graphical representation may be two-dimensional or three-dimensional, depending on dimension of the reference model. This affects the temporal re-arrangement as described below.

Video Synopsis Generation

Figure 4:
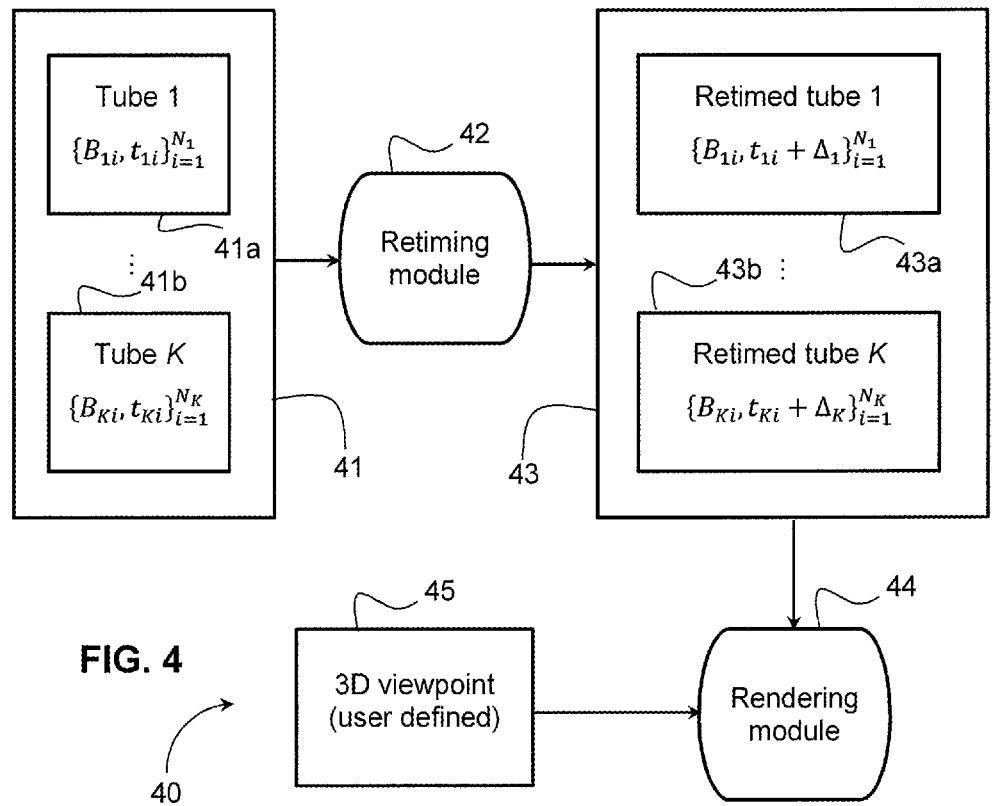
FIG. 4 is a block diagram showing functionality of the generation of a model based video synopsis.

The second stage of the proposed method generates a model-based video synopsis based on the object representation by spatio-temporal tubes, as described above with reference to (Eq. 3). FIG. 4 is a block diagram showing functionality of the generation of a model based video synopsis unit 400, whose input is a set of video objects represented as spatio-temporal tubes 41 (Eq. 3). Each tube consists of a sequence of 2D or 3D bounding boxes $B_j$ in the reference model coordinates with corresponding times $t_j$ 41a, 41b. A spatio-temporal rearrangement of these tubes is performed by a retiming module 42, which shifts all the time values of each object i by a constant $\Delta_I$ to form re-timed tubes 43a, 43b constituting output objects. The set of the retimed tubes 43a . . . k is passed to a rendering module 44 that generates a model-based video synopsis as explained below. In the case of a 3D reference model, the rendering module 44 inputs also a user defined 3D viewpoint 45 for the generation of 2D video frames from the 3D reference model and 3D objects.

Figure 5:
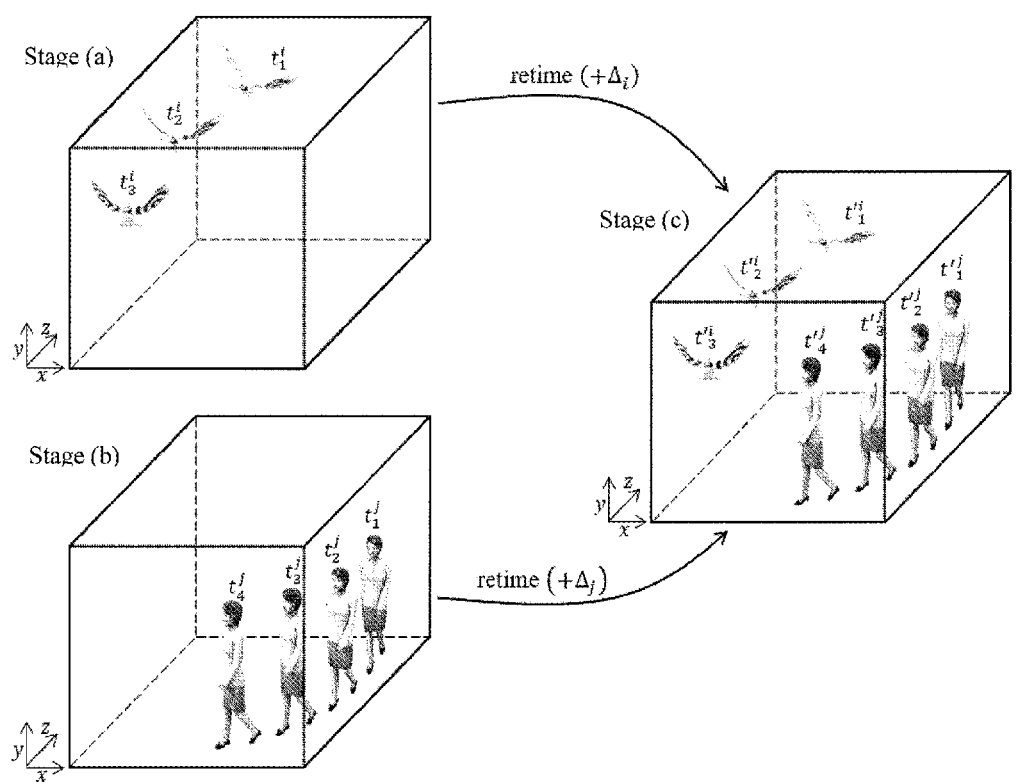
FIG. 5 is a pictorial representation of the spatio-temporal rearrangement (retiming) process.

FIG. 5 is a pictorial representation of the spatio-temporal rearrangement (retiming) process. Stage (a) shows the locations of object i after mapping into the reference model in the original times $t_1^i \ldots t_3^i$. Stage (b) shows the locations of an object j in original times $t_1^j \ldots t_4^j$, and stage (c) shows the results of the spatio-temporal rearrangement by the retiming process described above with reference to FIG. 4. The original times are shifted by object dependent constants $\Delta_i$ and $\Delta_j$, to obtain a synopsis video showing all objects but of shorter review time compared to the original video.

Spatio-Temporal Rearrangement

After extracting the scene objects and mapping them into the reference model, we have a set of spatio-temporal tubes, $\{Tube_i\}_{i=1}^n$. In order to achieve a dense short video, a retiming step is performed in which the tubes are re-arranged in time by adding an offset $\Delta_i$ to the rendering times of each tube i. $\Delta_i$ can be either positive or negative.

$$\text{Retimed-Tube}_i = \{B_j, t_j + \Delta_i\}_{j=0}^J \quad (4)$$

As described in [1, 3], a short video synopsis can be achieved using a greedy retiming algorithm. According to one approach, the objects can first be sorted by their total size, $\Sigma_j |B_j|$, which is the volume of the 3D tube along all frames. Alternatively, the objects can be sorted by their relevance to a predefined function [6], based on object information which was calculated during the object extraction step (Section 3.1.1). After sorting, for each tube i, a 1D parameter search is performed along the time axis for finding the first time $\bar{t}$ in which the amount of spatial overlap with already located tubes is smaller than a threshold. The retiming offset is then determined as $\Delta_i = \bar{t} - t_0$.

The original retiming algorithm in [1, 3] was described in the context of a 3D space-time domain with time axis and two spatial axes. This can be applied directly to any 2D reference model such as a map or aerial image, and set of tubes consisting of 2D object representations. Applying the same retiming algorithm in a 4D domain with time axis and three spatial axes is straightforward. The search for optimal retiming offsets $\Delta_i$, is still done along the time axis, and the only difference is the calculation of tubes' overlap which is done on intersections of 3D boxes instead of 2D rectangles. Therefore, near optimal retiming can be achieved using the same greedy approach.

Video Synopsis Rendering

The final model-based Video Synopsis is a synthetic video created by rendering the retimed tubes on a background image generated by the reference model.

In the case of a 2D reference model, such as a map, a video frame of rendering time t is created by displaying all the representations of objects with shifted times $t_j = t$ in the corresponding locations $B_j$ over a background image generated by the reference model, such as the map itself or a combination of the background images projected onto the reference model plane. The term "location" refers to the entire 2D or 3D region containing the object representation at rendering time $t_j = t$, not to a single 2D (or 3D) point.

In the case of a 3D reference model, a 3D viewpoint should be first determined, either fixed viewpoint for the entire clip, or varying viewpoint as a function of the rendering time t. This defines an image plane relative to the reference model. The rendered frame's background is generated by projection of the 3D model over the selected image plane. Then the object representations are displayed on the projected background in the corresponding locations (and poses, if the representations are 3D synthetic models).

Synchronized Video Synopsis

This section describes synchronized Video Synopsis (SVS). Given are K video streams recorded by stationary cameras, typically with full or partial overlaps between their fields of view. In the most relevant scenario for SVS, there are pairwise overlaps between some of the cameras' field of views. Otherwise, SVS works properly but the result is identical to the original video synopsis. We assume that the frame times in each video are known, so that the original videos can be synchronized. Our goal is to generate K synchronized video synopses, so that if an object in the scene is seen at the same time t in two original videos i and j, then it will be displayed in the corresponding video synopses at the same time t.

In the following we describe the SVS pipeline step by step.

Figure 6:
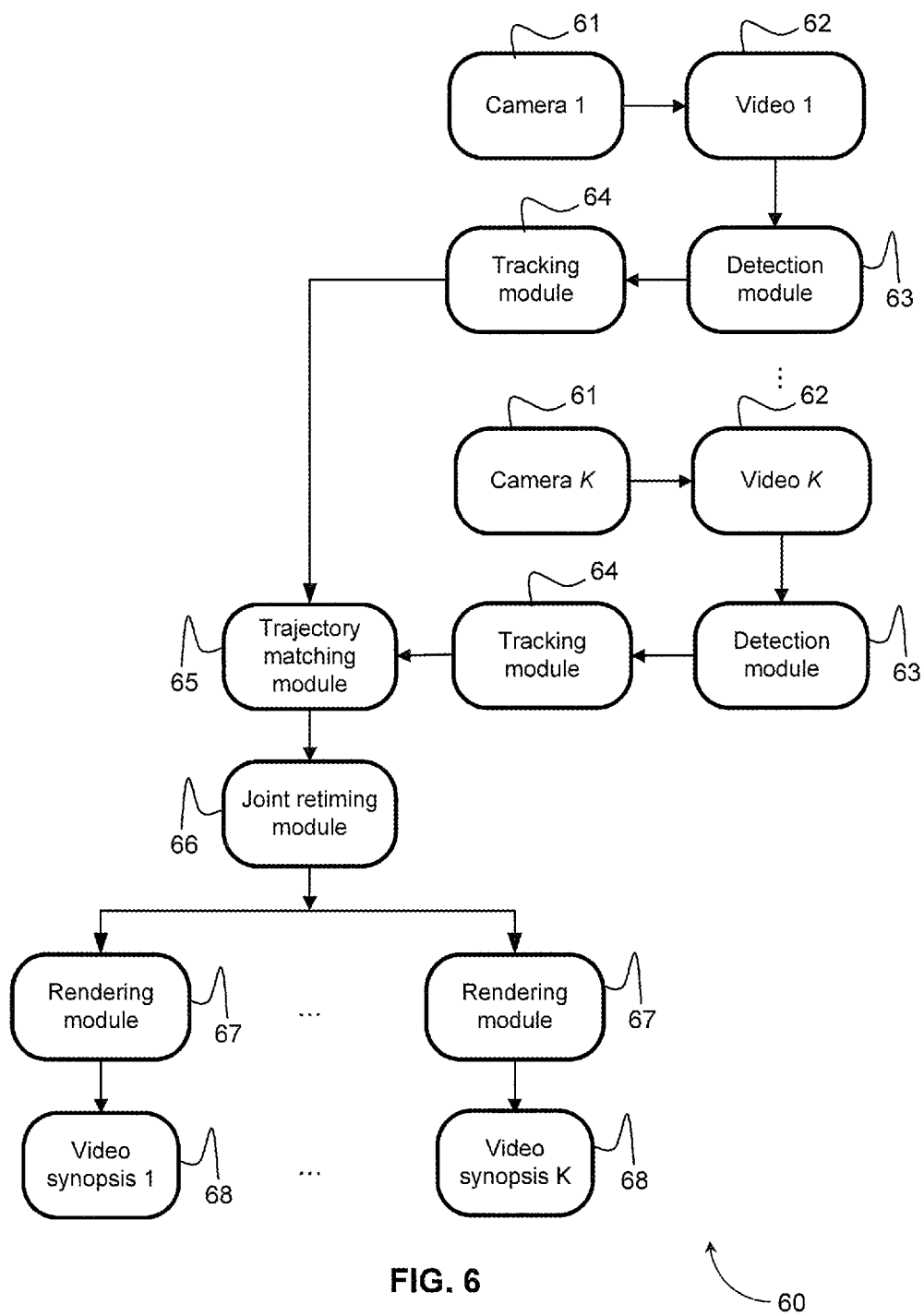
FIG. 6 is a block diagram showing the functionality of the synchronized video synopsis pipeline.

FIG. 6 is a block diagram a block diagram showing the functionality of the of the synchronized video synopsis pipeline 60. Multiple cameras 61 independently record respective video streams 62 whose objects are extracted. Similarly to model-based video synopsis, the object extraction process is performed by an object detection module 63 which detects objects per frame and provides 2D bounding boxes and an object tracking module 64 which connects the detected bounding boxes into object trajectories. A trajectory matching module 65 matches object trajectories from multiple cameras based on their appearance similarity so that sets of trajectories are created which represent simultaneous views of the same real object by different cameras. The object trajectories are then rearranged by a joint retiming module 66 in K spatio-temporal domains, so that an equal time offset $\Delta_m$ is assigned to all of the trajectories belonging to set m. The retimed objects from each original video are passed to a rendering module 67 which generates multiple synchronized video synopses 68. Any object which was recorded at the same original time by multiple cameras is displayed simultaneously by the resulting video synopses.

Object Extraction

As a first step of the SVS pipeline, object extraction is performed for each video independently as described above. This results in a set of object trajectories $Objs(c) = \{O_i^c\}_{i=1}^{n_c}$ where $\{O_i^c\}$ are object trajectories with trajectory index i and camera index c, as defined by Eqn. 1, and the total number of trajectories per camera c is $n_c$. Unlike model-based video synopsis, no mapping into a reference model is required, since multiple video synopses are generated in the coordinate systems of the original videos. On the other hand, as in model based video synopsis, it is possible to analyze the extracted objects and filter them according to one or more predefined filtering criteria. In such case, the steps described below are performed for the trajectories of only those objects which match the filtering criteria.

Grouping Objects Across Cameras

The second step of the SVS pipeline is grouping video object trajectories into disjoint sets of related objects in all the video sequences. Two video objects are defined as related if they represent the same real object. The grouping process consists of two stages: first we find pairs of related objects, and then we group them into disjoint sets using a graph based algorithm.

Matching Object Pairs

As mentioned above under the heading "Object Matching", it is possible to match video object pairs by applying different similarity functions which output different results. If we are interested to group all the instances of the same object in different times, an object reidentification method is applied which compares video object pairs and determines whether or not they represent the same real object. Alternatively, we may be interested just in finding synchronized views at the same time by different cameras. In such a case video object pairs with overlapping time ranges should be compared, and (optionally) different similarity methods can be also used such as space overlap and/or motion similarity. Grouping Related Objects After comparing all the required video object pairs, a undirected graph G is constructed which consists of vertices V representing the object trajectories $O_i^c$, and edges E between vertices ($O_i^c$, $O_{i'}^{c'}$) if the similarity score between the corresponding trajectories is greater than a threshold $t_{sim}$. The connected components of G represent sets of related video objects, i.e., all the objects at the same connected component are different views of the same real object. It should be noted that if only video objects with time overlap have been matched, then there might be multiple sets of related video objects which represent the same real object at different times.

We denote these disjoint sets by $$ID_m = \{O_{i_1}^{c_1} \ldots O_{i_{n_m}}^{c_{n_m}}\}$$

where $n_m$ is the number of trajectories in $ID_m$, $i_j$ is a video object index, and $c_j$ is a camera index.

Joint Spatio-Temporal Rearrangement

The original video synopsis method re-arranges the extracted objects in a spatio-temporal domain whose coordinates system consists of the time axis and the spatial image axes. In the following we extend the spatio-temporal rearrangement (retiming) technique described in [1, 2, 3, 4] into multiple spacetime volumes $ST_1 \ldots ST_K$ with spatial coordinates corresponding to those of the input video sequences, and a common time axis.

Similar as described above under the heading "Spatio-Temporal Rearrangement", the object trajectories ($O_i^c$) are transformed into spatio-temporal tubes $\{Tube_i^c\}_{i=1}^{n_c}$, which are shifted along the time dimension by adding an offset $\Delta_i^c$ to their rendering times. The same greedy algorithm is applied for finding the offsets which best compress the objects in each spacetime volume $ST_c$, but with the following constraint on the members of related object sets:

Let $$O_{i_1}^{c_1} \ldots O_{i_{n_m}}^{c_{n_m}}$$

be the trajectories of objects belonging to the mth set of related video objects, $ID_m$, with start and end times $\{(s_j, e_j)\}_{j=1}^{n_m}$, so that $s_1 \leq s_2 \ldots \leq s_{n_m}$ (i.e. the objects are sorted by their start times).

For each object $O_{i_j}^{c_j}$, $j > 1$ define relative time offset w.r.t the previous object, $\delta_j = \min(s_j, e_{j-1}) - s_{j-1}$.

Let $\Delta_m$ be the display time of $O_1^{c_1}$, the object with smallest start time in $ID_m$. Then the display time of the jth object is $\Delta_m + \Sigma_{k=2}^j \delta_k$.

The above constraint implies that related video objects with overlapping time ranges are displayed simultaneously in all the resulting video synopses, while time gaps between related video objects with non-overlapping time ranges are eliminated. A single parameter $\Delta_m$ determines the display times of the entire video object set $ID_m$. While searching for an optimal $\Delta_m$ value, the entire set $ID_m$ is added simultaneously to the multiple volumes $ST_1 \ldots ST_K$, and a one-dimensional search is performed along the common time axis. The cost of each time coordinate t is determined by the sum of its costs in $ST_1 \ldots ST_K$.

Video Synopsis Rendering

The result of the above joint rearrangement process is K sets of re-ordered (or retimed) tubes, from which K video synopses are constructed using the same rendering method described in by the authors of the original video synopsis [1, 2, 3, 4]. Due to the time shift by equal offsets $\Delta_m$ of each set of matching tubes, the resulting synopses are synchronized so that the different views of an object at the same original time are displayed simultaneously by all of the resulting video synopses. This is different from processing the videos independently by the original method, which displays the different views in different times.

Alternative Joint Rearrangements

The above constraint on the display times of related object sets $ID_m$ can be modified or replaced by alternative procedure, which results in different variants of joint spatio-temporal rearrangement. Here we describe one such alternative procedure:

Let $c_1 \ldots c_k$ be the camera indexes of objects belonging to the mth set of related video objects, $ID_m$.

For each subset of objects in $ID_m$ with camera index $c_j$, compute relative display times $$\delta_{j_1} = 0 \leq \delta_{j_2} \ldots \leq \delta_{j_{n_{c_j}}}$$

by regular spatio-temporal rearrangement (retiming) in $ST_j$ using the algorithm descried in [1, 3]. The term $n_{c_j}$ is the number of objects recorded by the jth camera.

Search for an optimal display time $\Delta_m$ which minimizes the sum of costs of adding each object $O_{j_l}^{c_j}$ to the relevant space-time volumes $ST_j$ in time $\Delta_m + \delta_{j_l}$ The above procedure applies the regular retiming algorithms multiple times to determine the relative display times within each camera related subset. Afterwards, the entire set $ID_m$ is added simultaneously to the multiple volumes $ST_1 \ldots ST_K$ by a one-dimensional search along the common axis time, which determines the final object display times. The result is a set of video synopses in which all the instances of the same real object are displayed simultaneously. Unlike the variant described above, if a real object is recorded by different input videos in different original times, its recordings are still shown simultaneously by the resulting video synopses.

Simple Combined Video Synopsis

In the previous description, we have proposed two advanced methods for the generation of Video Synopsis from multiple cameras: model-based VS and synchronized VS. We now propose a simple complementary method. Given multiple videos from different cameras, either static or dynamic, the proposed method generates a single Video Synopsis which reduces the overall review time. We first describe a basic procedure, than add an optional extension based on object re-identification.

Basic Method

Object Extraction

Given multiple input videos, the object extraction step is performed for each input video independently by means of object detection, segmentation of pixel-level masks, multiple object tracking and (optionally) object filtering as described above (under the heading "Object Extraction (OX)").

Spatio-Temporal Rearrangement

After extracting object trajectories from all input videos, spatio-temporal rearrangement (retiming) is applied in a common space-time volume ST. The spatial dimensions of ST are defined by the input videos widths and heights, so that each object frame (i.e. bounding box and segmented mask) remains with its original spatial location in the common spatio-temporal domain. Also here, "location" refers to the entire 2D region of the segmented object mask, not only a single 2D point. Since all the objects are mapped into the same space-time volume, a known retiming algorithm such as described in [1, 3] can be applied for assigning new display times so that the overall review time is minimized subject to overlap cost.

Rendering

After determining the display times of all the objects, it is straightforward to render the segmented object masks, or any other graphical representation, over an arbitrary background image such as black/checkerboard background, or a background image learned statistically from one of the input videos (as in [1, 3]), etc. The result is a single Video Synopsis that not only reduces the review time compared to the source video, but also makes it possible to watch all the relevant content in a single output video. All this is achieved with no need of camera calibration, object matching, mapping into reference model space and graphical rendering as in the model-based Video Synopsis described previously.

Extension with Object Re-Identification

If an object re-identification method can be applied as described above under the heading "Object Matching", it is possible to find pairs of related objects as described above under the heading "Matching Object Pairs" and group them into related object sets as described above under the heading "Grouping related Object". Unlike synchronized Video Synopsis, in which related objects are rendered simultaneously in multiple output videos, the proposed method outputs a single Video Synopsis. Therefore, the multiple input video objects are transformed into a single output video object by the following steps:

1. Let $ID_m$ be the mth set of related objects, $O_1 \ldots O_{n_m}$, with start and end times $(s_1, e_1) \ldots (s_{n_m}, e_{n_m})$ so that $s_1 \leq s_2 \ldots \leq s_{n_m}$.
2. Set the relative offset of the first object $\delta_1 = 0$.
3. For each object $j>1$, set the relative offset from the previous object $j_1$ as $\delta_j = \min(s_j, e_{j-1}) - e_j$. The offset of the jth object from the first object is therefore $P_k = 1^j \delta_k$.
4. At that point, for each time $s_1 \leq t \leq P_k = 1^{n_m} \delta_{ken_m}$ there exists one or more object with relevant frame. The rendered object can be represented by the segmented mask of one selected object frame (e.g. those with the smallest index, or those with largest size), or by any linear combination of multiple object frames.

The retiming and rendering steps as described above under the broad heading "Simple Combined Video Analysis" are now applied to the generated output video objects instead of the input video objects. The result is a single Video Synopsis that shows all the real objects recorded by the different input videos, where real objects recorded by multiple cameras are represented by a single video object.

Without derogating from the above generalizations, the inventive concepts encompassed by the invention include the following:

Inventive concept 1: A computer-implemented method for generating an output video, the method comprising:

obtaining respective source videos recorded by at least two cameras in a site, each of said source videos comprising multiple video frames containing video objects imaged by said cameras, said video objects corresponding to multiple instances of one or more respective source objects;

obtaining for detected video objects in each source video, respective tracks containing locations of the respective video objects in the video frames;

for at least some of said video objects computing output video objects having a new start display time of each video object selecting a background image on which to render the retimed video objects; and generating an output video by rendering the output video objects or graphical representations thereof at their new display times over the selected background image such that:
  (i) instances imaged by different cameras at different times are represented simultaneously in the output video;
  (ii) at least two output video objects originating from a common camera have different relative display times to their respective source objects; and
  (iii) there exists at least one location in the output video wherein there are represented instances imaged by two different cameras.

Inventive concept 2: The method according to inventive concept 1, including after obtaining respective tracks and prior to computing output video objects:

calculating locations of the detected video objects in a predetermined space at each frame time, based on said locations in the source video and known parameters of the respective camera from which the frame is obtained.

Inventive concept 3: The method according to inventive concept 2, wherein displaying the output objects or graphical representations thereof includes:

selecting a respective graphical representation for each object;

selecting a 3D viewpoint for each frame in the output video; and displaying the respective graphical representations of the output objects inside the predetermined space by projecting graphical representations of the predetermined space and the objects onto a 2D image plane defined by the selected 3D viewpoint.

Inventive concept 4: The method according to any one of inventive concepts 1 to 3, wherein at least one of said videos is recorded by a dynamic camera whose parameters are known at each frame time.

Inventive concept 5: The method according to inventive concept 3, wherein selecting the 3D viewpoint is done before computing output objects, and computing output objects is performed only on objects visible in the selected 3D viewpoint.

Inventive concept 6: The method according to any one of the preceding inventive concepts, wherein the graphical representation of the object is a 3D mesh or 3D point cloud.

Inventive concept 7: The method according to inventive concept 2 or any inventive concept dependent thereon, wherein the predetermined space is a 2D map or a 2D diagram or a 2D satellite image, and the graphical representation of the object is a 2D icon.

Inventive concept 8: The method according to inventive concept 2 or any inventive concept dependent thereon, further including after calculating locations of the detected objects and before computing output objects:

matching recordings of each unique object by different cameras in overlapping times based on appearance similarity methods and/or geometric information such as overlapping locations and similar motion pattern in the predetermined space; and merging sets of matching object tracks into a single object track in the predetermined space by averaging respective matched locations of the object at each overlapping frame time.

Inventive concept 9: A computer-implemented method for generating an output video, the method comprising:

obtaining respective source videos recorded by at least two cameras in a site, each of said source videos comprising multiple video frames containing video objects imaged by said cameras, said video objects corresponding to multiple instances of one or more respective source objects traversing the site;

computing a background image for each source video;

computing respective tracks of video objects detected in each source video, wherein each track contains the locations of the respective video object at each video frame;

associating at least one set of related video objects which consists of two or more video objects from at least two different source videos representing the same source object;

computing output objects each having a new display time, and generating output videos for said at least two cameras by rendering the output objects at their new display times over the respective computed background image such that:
  (i) for each camera there are at least two output objects, both computed from video objects at said camera which do not appear in any common frame at the source video, which are displayed in the respective output video in at least one common frame;
  (ii) for each camera there are at least two output objects, both computed from video objects at said camera which appear in at least one common frame at the source video, which have different relative display times to their respective video objects; and
  (iii) at least two related objects, each derived from a different camera, are displayed in the respective output videos at a common frame time.

Inventive concept 10: The method according to inventive concept 9, wherein there is an overlap between the fields of view of at least two cameras, and two video objects in two source videos are considered related if they represent an identical source object viewed in at least one common frame time by the said cameras.

Inventive concept 11: The method according to inventive concept 9 or 10, wherein computing output objects includes assigning a new start display time to each object such that for every pair of frames, two related objects having the same original time have the same display time.

Inventive concept 12: The method according to inventive concept 1, wherein:

generating the output video comprises rendering the computed output objects over the selected background image, at the same spatial locations as the respective video objects and at their new display times.

Inventive concept 13: The method according to inventive concept 12, comprising:

associating at least one set of related video objects which consists of two or more video objects representing the same source object; and merging each said set of related objects into a single video object, by merging at each frame the instances of the respective video objects.

Inventive concept 14: The method according to inventive concept 13, wherein the merged object is constructed by selecting at each frame time the pixel level segmentation of one of the objects in the set.

Inventive concept 15: The method according to inventive concept 13, wherein the merged object is constructed by computing at each frame a linear combination of the pixel level segmentations of the objects belonging to the set.

Inventive concept 16: The method according to any one of the preceding inventive concepts, including prior to computing output objects, filtering the objects according to at least one well-defined filtering criterion, so that a reduced subset of objects is displayed by the output video.

Inventive concept 17: The method according to inventive concept 16, wherein the at least one filtering criterion includes relevance to one or more object attributes such as object class, duration, path, color, shape etc.

Inventive concept 18: The method according to inventive concept 16 or 17, wherein the retiming order of the selected objects is determined by their relevance to the at least one filtering criterion.

Inventive concept 19: The method according to any one of the preceding inventive concepts wherein at least two objects are moving objects.

Inventive concept 20: A computer-readable memory storing program instructions, which when run on at least one processor cause the at least one processor to implement the method according to any one of the preceding inventive concepts.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It should also be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

CONCLUSION

The invention proposes three methods and systems which extend Video Synopsis from a single camera into multiple cameras.

First we proposed model based Video Synopsis, a synthetic video in which objects or their representatives are rendered asynchronously inside a 2D or 3D reference model. This extends Video Synopsis from a camera dependent mode which is limited to a single stationary camera with specific viewpoint, into model based mode in which objects viewed by multiple cameras, static or dynamic, are displayed on a 2D or inside 3D reference model. We described a system which extracts the scene objects from multiple cameras, transforms them into representative tubes which are located in the reference model, rearranges these tubes in a related spatio-temporal domain, and renders a model based Video Synopsis from a selected (fixed or dynamic) viewpoint. The resulting model based Video Synopsis allows an efficient review of large video content inside a unified, camera independent scene model.

We also proposed synchronized video synopsis in which real objects which are viewed by multiple cameras are displayed synchronously by multiple video synopses. This is based on object matching by similarity combined with a novel joint spatio-temporal rearrangement scheme. Synchronized video synopsis is independent from scene reconstruction and camera calibration, and significantly extends the capabilities of an automatic search in large video content.

Finally, we proposed a simple method to display objects extracted from multiple videos by a single Video Synopsis, with an extension to rendering mode that utilizes information obtained by object re-identification methods for joint display of multiple instances of the same real object.

The invention claimed is:

1. A computer-implemented method for generating an output video, the method comprising:
    obtaining respective source videos recorded by at least two cameras in a site, each of said source videos comprising multiple video frames containing video objects imaged by said cameras, said video objects corresponding to multiple instances of one or more respective source objects;
    obtaining for detected video objects in each source video, respective tracks containing locations of the respective video objects in the video frames;
    calculating locations of the detected video objects in a predetermined space at each frame time, based on said locations in the source video and known parameters of the respective camera from which the frame is obtained;
    for at least some of said video objects computing output video objects having a new start display time of each video object:
    selecting a background image on which to render the output video objects; and
    generating an output video by rendering the output video objects or graphical representations thereof at their new display times over the selected background image such that:
        instances imaged by different cameras at different times are represented simultaneously in the output video;
        at least two output video objects originating from a common camera have different relative display times to their respective source objects; and
        there exists at least one location in the output video imaged by two different cameras.

2. The method according to claim 1, wherein displaying the output objects or graphical representations thereof includes:
    selecting a respective graphical representation for each object;
    selecting a 3D viewpoint for each frame in the output video; and
    displaying the respective graphical representations of the output objects inside the predetermined space by projecting graphical representations of the predetermined space and the objects onto a 2D image plane defined by the selected 3D viewpoint.

3. The method according to claim 2, wherein selecting the 3D viewpoint is done before computing output objects, and computing output objects is performed only on objects visible in the selected 3D viewpoint.

4. The method according to claim 1, wherein at least one of said videos is recorded by a dynamic camera whose parameters are known at each frame time.

5. The method according to claim 1, wherein the graphical representation of the object is a 3D mesh or 3D point cloud.

6. The method according to claim 1, wherein the predetermined space is a 2D map or a 2D diagram or a 2D satellite image, and the graphical representation of the object is a 2D icon.

7. The method according to claim 1, further including after calculating locations of the detected objects and before computing output objects:
    matching recordings of each unique object by different cameras in overlapping times based on appearance similarity methods and/or geometric information such as overlapping locations and similar motion pattern in the predetermined space; and
    merging sets of matching object tracks into a single object track in the predetermined space by averaging respective matched locations of the object at each overlapping frame time.

8. The method according to claim 1, including prior to computing output objects, filtering the objects according to at least one filtering criterion, so that a reduced subset of objects is displayed by the output video.

9. The method according to claim 8, wherein the at least one filtering criterion includes relevance to one or more object attributes such as object class, duration, path, color, shape etc.

10. The method according to claim 8, wherein the output objects are displayed at respective times that are determined by a relevance of the output objects to the at least one filtering criterion.

11. The method according to claim 1, wherein at least two objects are moving objects.

12. A non-transitory computer-readable memory storing program instructions, which when run on at least one processor cause the at least one processor to implement the method according to claim 1.

13. A method for generating an output video, the method comprising:
    obtaining respective source videos recorded by at least two cameras in a site, each of said source videos comprising multiple video frames containing video objects imaged by said cameras, said video objects corresponding to multiple instances of one or more respective source objects traversing the site;
    computing a background image for each source video;
    computing respective tracks of video objects detected in each source video, wherein each track contains locations of the respective video object at each video frame;
    associating at least one set of related video objects which consists of two or more video objects from at least two different source videos representing the same source object;
    computing output objects each having a new display time, and
    generating output videos for said at least two cameras by rendering the output objects at their new display times over the respective computed background image such that:
    for each camera there are at least two output objects, both computed from video objects at said camera which do not appear in any common frame at the source video, which are displayed in the respective output video in at least one common frame;

for each camera there are at least two output objects, both computed from video objects at said camera which appear in at least one common frame at the source video, which have different relative display times to their respective video objects; and at least two related objects, each derived from a different camera, are displayed in the respective output videos at a common frame time;

wherein computing output objects includes assigning a new start display time to each object such that for every pair of frames, two related objects having the same original time have the same display time.

14. The method according to claim 13, wherein there is an overlap between respective fields of view of at least two cameras, and two video objects in two source videos are considered related if they represent an identical source object viewed in at least one common frame time by the said cameras.

15. The method according to claim 13, wherein:

generating output videos comprises rendering the computed output objects over the selected background image, at the same spatial locations as the respective video objects and at their new display times.

16. The method according to claim 15, comprising:

associating at least one set of related video objects which consists of two or more video objects representing the same source object; and merging each said set of related objects into a single video object, by merging at each frame the instances of the respective video objects.

17. The method according to claim 16, wherein the merged object is constructed by selecting at each frame time pixel level segmentation of one of the objects in the set.

18. The method according to claim 16, wherein the merged object is constructed by computing at each frame a linear combination of the pixel level segmentations of the objects belonging to the set.

19. The method according to claim 13, including prior to computing output objects, filtering the objects according to at least one well-defined filtering criterion, so that a reduced subset of objects is displayed by the output video.

20. The method according to claim 19, wherein the at least one filtering criterion includes relevance to one or more object attributes such as object class, duration, path, color, shape etc.

21. The method according to claim 13, wherein the output objects are displayed at respective times that are determined by a relevance of the output objects to the at least one filtering criterion.

22. The method according to claim 13, wherein at least two objects are moving objects.

23. A non-transitory computer-readable memory storing program instructions, which when run on at least one processor cause the at least one processor to implement the method according to claim 13.

* * * * *